R. GLOVER.
Field Roller.
No. 97,905.  Patented Dec. 14, 1869.
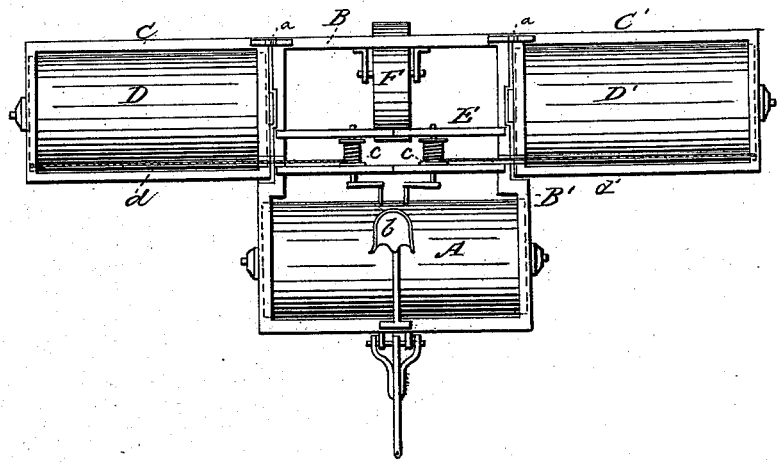
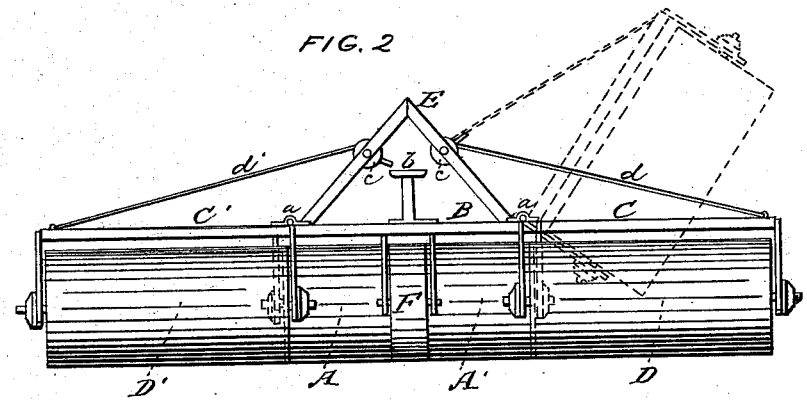
WITNESSES:
J. R. Smiley
C. N. Woodward
INVENTOR:
Robert Glover
J. Fraser & Co
att'ys

UNITED STATES PATENT OFFICE.

ROBERT GLOVER, OF TONAWANDA, NEW YORK.

Letters Patent No. 97,905, dated December 14, 1869.

IMPROVEMENT IN FIELD ROLLERS.

The Schedule referred to in these Letters Patent and making part of the same.

*To all whom it may concern:*

Be it known that I, ROBERT GLOVER, of Tonawanda, in the county of Erie, and State of New York, have invented certain Improvements in Field-Rollers; of which the following is a specification.

My invention relates to field-rollers, in which three rolling-surfaces are used, and consists in the arrangement of parts whereby the outer rollers may be elevated, as hereinafter described.

In the drawings—

Figure 1 is a plan, and

Figure 2 is a rear elevation.

A represents the front roller, running in an elongated frame, B.

The rear sides of this frame are attached by hinges a a, to supplementary frames C C', in which run, respectively, rollers D D'.

The front roller A is made wide enough to overlap the path of the rollers D D', so that the entire surface passed over is evenly rolled, without leaving creases or ridges.

The hinging of the frames B C C' together allows a play up and down of side rollers D D', which is very important on uneven ground.

To facilitate passing over hilly land, and, also, over stumps, large stones, and other obstructions, I form a triangular derrick or frame, E, on the top of, and attached to the centre frame B, just back of the driver's seat b.

In this derrick or frame E, I arrange two windlasses, c c', the cranks of which can be operated by the driver, one by the right hand, and the other by the left.

Around each windlass is passed a rope or chain, d d', one end of which is fastened to the outside of frames C C', and by turning the crank of either or both windlasses, the outside rollers are raised up to any degree for the purpose above named, or to pass through a gate or any narrow place. This is an important feature of my invention, which no other roller possesses, that I am acquainted with.

To balance and sustain the centre frame, when the side rollers are raised, I place a wheel, F, back of the front roller A, and attached to the back of the centre frame B, so that it partly sustains the weight of the machine, as above stated. This is also an important feature, as without it the whole machine would tip over backward.

A novel feature of my invention consists in at the same time so arranging said side rollers that they may be elevated, as shown by the dotted lines in fig. 2. Thus a wide or narrow sweep may be formed, as circumstances require.

When the side rollers are not in use, they may be detached from, or used to weight the centre roller.

I am acquainted with the patent of H. E. Crowe, March 12, 1869, which shows three rollers, two of them hinged upon a rod, and the third fastened to the end of it.

This not the equivalent of my invention, and he has to use one roller detached, or the three together, and they cannot be raised and lowered, like mine.

There are other patents that I am acquainted with, showing three rollers, some of them with a roller behind, and the two running on a single shaft. They are not hinged or arranged like mine, and none of them possess the balance-wheel.

I claim—

1. The triangular frame or derrick E, having windlasses c c', with ropes or chains d d', when combined with the rollers D D' and A, in the manner and for the purpose specified.

2. The balance-wheel F, in combination with the rollers D D' A, arranged and operating as described.

3. The arrangement of the machine, as a whole, consisting of the hinged frames B C C', rollers A D D', balance-wheel F, derrick E, with windlasses c c', and ropes d d', the whole operating in the manner and for the purpose specified.

In witness whereof, I have hereunto signed my name, in the presence of two subscribing witnesses.

ROBERT GLOVER.

Witnesses:
 J. R. DRAKE,
 C. N. WOODWARD.